(12) United States Patent
Tazaki

(10) Patent No.: US 7,420,185 B2
(45) Date of Patent: Sep. 2, 2008

(54) STIMULABLE PHOSPHOR PANEL

(75) Inventor: Seiji Tazaki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/230,727

(22) Filed: Sep. 21, 2005

(65) Prior Publication Data

US 2006/0081789 A1    Apr. 20, 2006

(30) Foreign Application Priority Data

Sep. 21, 2004    (JP)    ............... 2004-272749

(51) Int. Cl.
G03B 42/08    (2006.01)
(52) U.S. Cl. .................................. 250/484.4
(58) Field of Classification Search ............. 250/484.4, 250/483.1, 485.1
See application file for complete search history.

(56) References Cited

U.S. PATENT DOCUMENTS 7,057,188 B2 *    6/2006    Struye et al. ............. 250/484.4

2003/0160188 A1    8/2003    Tazaki
2006/0065861 A1 *    3/2006    Tazaki ..................... 250/580

FOREIGN PATENT DOCUMENTS

JP    05-249299 A    9/1993
JP    2789194 B2    6/1998

* cited by examiner

Primary Examiner—Constantine Hannaher
(74) Attorney, Agent, or Firm—Sughrue Mion, PLLC

(57) ABSTRACT

The stimulable phosphor panel includes a rigid substrate, a stimulable phosphor layer formed on the rigid substrate and a transparent moisture-resistant protective layer formed on the stimulable phosphor layer. The stimulable phosphor layer is housed and sealed in an airtight area formed between the rigid substrate and the transparent moisture-resistant protective layer. The panel further includes a buffer space communicating with the airtight area capable of expansion/contraction. The buffer space is defined by a recess formed in the substrate, a ventilation hole connecting the recess with the airtight area and being formed in the substrate, and a flexible sheet covering an opening of the recess. Or, the buffer space has a volume variable within a range from 1/10 to twice of a sum of a spatial volume of the airtight area and a volume of the buffer space at 1 atm.

13 Claims, 3 Drawing Sheets

STIMULABLE PHOSPHOR PANEL

BACKGROUND OF THE INVENTION

The present invention relates to a technical field of stimulable phosphor panels and, more specifically, a stimulable phosphor panel with a transparent moisture-resistant protective layer for sealing a stimulable phosphor layer therewith.

There are known a class of phosphors which accumulate a portion of applied radiations (e.g. x-rays, $\alpha$-rays, $\beta$-rays, $\gamma$-rays, electron beams, and uv (ultraviolet) radiation) and which, upon stimulation by exciting light such as visible light, give off a burst of light emission in proportion to the accumulated energy. Such phosphors called stimulable phosphors are employed in medical and various other applications.

An exemplary application is a radiographic image information recording and reproducing system which employs a stimulable phosphor panel having a film formed of the stimulable phosphor (stimulable phosphor layer, hereinafter referred to simply as phosphor layer). The stimulable phosphor panel is hereinafter referred to as the phosphor panel and also called the radiographic image conversion sheet. This radiographic image information recording and reproducing system has already been commercialized as FCR (Fuji Computed Radiography) from Fuji Photo Film Co., Ltd.

In that system, a subject such as a human body is irradiated with x-rays or the like to record radiographic image information about the subject on the phosphor panel (more specifically, the phosphor layer). After the radiographic image information is thus recorded, the phosphor panel is scanned two-dimensionally with exciting light such as laser light to produce stimulated emission which, in turn, is read photoelectrically to yield an image signal. Then, an image reproduced on the basis of the read image signal is output as the radiographic image of the subject, typically to a display device such as CRT or on a recording material such as a photographic material.

The phosphor panel is typically produced by the steps of first preparing a coating solution having the particles of a stimulable phosphor dispersed in a solvent containing a binder, etc., applying the coating solution to a support in panel form that is made of glass or resin, and drying the applied coating.

Phosphor panels are also known that are made by forming a phosphor layer on a support through methods of vacuum film deposition (vapor-phase film formation) such as vacuum evaporation or sputtering (see JP 2789194 B and JP 5-249299 A). The phosphor layer prepared by the vacuum film deposition has excellent characteristics. First, it contains less impurities since it is formed under vacuum; further, it is substantially free of any substances other than the stimulable phosphor, as exemplified by the binder, so it has high uniformity in performance and still assures very high luminous efficiency.

One factor for deterioration of characteristics of the phosphor panel is moisture absorption by the stimulable phosphor layer. The stimulable phosphor layer, in particular, the alkali halide-based stimulable phosphor layer having favorable characteristics, has high moisture absorption and easily absorbs moisture even in a normal environment (normal temperature/normal humidity). As a result, deterioration of sharpness of a reproduced image or the like occurs due to deterioration of photostimulated luminescence characteristics, that is, sensitivity, or deterioration of crystallinity of the stimulable phosphor (destruction of columnar crystals in the case of the alkali halide-based stimulable phosphor having a columnar structure, for example).

Some of known stimulable phosphor panels avoid such inconveniences by using a transparent moisture-resistant sheet as a protective layer and sealing a stimulable phosphor layer in an airtight area between the transparent moisture-resistant protective layer and a substrate.

However, when used in a high-altitude place where the atmospheric pressure is low or in a high-temperature environment, a stimulable phosphor panel with its stimulable phosphor layer hermetically sealed between a transparent moisture-resistant protective layer and a substrate causes gas in the airtight area between the transparent moisture-resistant protective layer and the substrate to expand to enlarge the distance between the respective layers, which may warp the stimulable phosphor layer.

For instance, when there is a gap between a transparent moisture-resistant protective layer and a stimulable phosphor layer in a stimulable phosphor panel, excitation light with which the stimulable phosphor layer is irradiated through the transparent moisture-resistant protective layer in order to read a radiographic image recorded on the stimulable phosphor layer is repeatedly reflected between the stimulable phosphor layer and the transparent moisture-resistant protective layer. Therefore, the area of the stimulable phosphor layer which is irradiated with excitation light varies with the length of the gap between the stimulable phosphor layer and the transparent moisture-resistant protective layer which is changed by the expansion of gas or the like.

FIG. 3 shows how excitation light Le is reflected when a gap 120 between a transparent moisture-resistant protective layer 118 and a stimulable phosphor layer 114 is wide. In order to read a radiographic image recorded on the stimulable phosphor layer 114, the excitation light Le reflected between the transparent moisture-resistant protective layer 118 and the stimulable phosphor layer 114 spreads-over an area R1.

On the other hand, FIG. 4 shows how the excitation light Le is reflected when the transparent moisture-resistant protective layer 118 and the stimulable phosphor layer 114 are close to each other. In this case, the distance the excitation light travels each time it is reflected is short. Accordingly, the excitation light Le is reflected between the transparent moisture-resistant protective layer 118 and the stimulable phosphor layer 114 within an area R2, which is smaller than the area R1.

Thus, even if excitation light is reflected the same number of times between the transparent moisture-resistant protective layer 118 and the stimulable phosphor layer 114, the area irradiated with the excitation light varies with the distance between the two layers. More specifically, the area irradiated with excitation light changes with the distance between the transparent moisture-resistant protective layer 118 and the stimulable phosphor layer 114.

For example, when the gap between the transparent moisture-resistant protective layer 118 and the stimulable phosphor layer 114 increases, the stimulable phosphor layer 114 generates as much photostimulated luminescence as when irradiated with a flux of excitation light thick enough to cover the wide area R1, which is larger than a photostimulated luminescence detection area where photostimulated luminescence is detected to obtain image signals and form a radiographic image from the image signals. The photostimulated luminescence outside of the detection area is also detected and lowers the sharpness of the resultant radiographic image.

The stimulable phosphor layer 114 may often be warped (lifted) due to expansion of gas in the airtight area if the stimulable phosphor layer 114 is bonded to the transparent moisture-resistant protective layer 118. This state is conceptually shown in FIG. 5. The stimulable phosphor layer 114 is irradiated with excitation light at a given point H1 and, once warped, at a point H2 which is different from the point H1.

Once warped, the stimulable phosphor layer 114 that is to be irradiated with the excitation light Le at the given point H1 (a point H1' on the warped stimulable phosphor layer 114) is irradiated at a different point from the point H1, that is, the point H2, and photostimulated luminescence from the point H2 is detected by a detection means 122 which is set so as to detect photostimulated luminescence from the point H1.

As a result, the detection means 122 has lowered efficiency in collecting photostimulated luminescence. Furthermore, image signals obtained at the point H2 from which the photostimulated luminescence is emitted and which is offset from the given point H1' on the warped stimulable phosphor layer 114 (H1 prior to the warping), form a distorted radiographic image, making it difficult to read a radiographic image recorded on the stimulable phosphor layer 114 accurately.

In order to solve this problem, the inventor of the present invention has provided a stimulable phosphor panel capable of avoiding moisture absorption in a stimulable phosphor layer and stopping changes in temperature and atmospheric pressure from lowering the quality of image signals read from the stimulable phosphor layer (see US 2003/0160188 A). This stimulable phosphor panel has a buffer space that can freely expand or contract and that communicates with an airtight area where the stimulable phosphor layer is formed between a substrate and a transparent moisture-resistant protective layer.

A specific example of this panel is shown in FIG. 6. A stimulable phosphor panel 140 of FIG. 6 has a substrate 112 with a ventilation hole 126 formed so as to communicate with an airtight area where a stimulable phosphor layer 114 is formed. A moisture-resistant cylinder 144 is connected to the ventilation hole 126 and fixed to the rear side of the substrate 112. Inserted in the cylinder 144 is a piston 142 which seals the cylinder 144 and can move freely along the length of the cylinder 144. A closed space formed inside the cylinder 144 by the piston 142 and the cylinder 144 is a buffer space 148.

Another example is shown in FIG. 7. A stimulable phosphor panel 150 of FIG. 7 uses a transformable sheet material for a a stimulable phosphor layer 114. The transparent moisture-resistant protective layer 118 has plural pockets 152 that serve as buffer spaces.

According to the stimulable phosphor panel in US 2003/016188 A, changes in volume of the airtight area where the stimulable phosphor layer is formed due to changes in temperature and atmospheric pressure can be absorbed by, in the stimulable phosphor panel 140 of FIG. 6, moving the piston 142 and changing the volume of the buffer space 148 or, in the stimulable phosphor panel 150 of FIG. 7 making the pockets 152 expand or contract. Thus, the stimulable phosphor panels in US 2003/0160188 A can advantageously prevent a change in volume of the airtight space from causing the aforementioned problems including a change in distance from the transparent moisture-resistant protective layer 118 to the stimulable phosphor layer 114 and warping of the stimulable phosphor layer 114.

However, every stimulable phosphor panel disclosed in US 2003/0160188 A has a buffer space located outside the panel. Depending on the size and use of the stimulable phosphor panel, and environment in which the stimulable phosphor panel is used, enough buffer space may not be secured, or the stimulable phosphor panel has to be often uspsized to secure enough buffer space.

SUMMARY OF THE INVENTION

The present invention has been made in order to solve the prior art problems described above and an object of the present invention is to provide a stimulable phosphor panel which has a stimulable phosphor layer sealed with a transparent moisture-resistant protective layer, which prevents moisture absorption in the stimulable phosphor layer, which has a function of stopping changes in temperature and atmospheric pressure from lowering the quality of image signals read from the stimulable phosphor layer of the stimulable phosphor panel, and which is capable of securing a large enough buffer space without the necessity of upsizing the stimulable phosphor panel.

In order to attain the above object, in a first aspect of the present invention, there is provided a stimulable phosphor panel comprising: a rigid substrate; a stimulable phosphor panel comprising: a rigid substrate; a stimulable phosphor layer formed on the rigid substrate; and a transparent moisture-resistant protective layer formed on the stimulable phosphor layer, wherein the stimulable phosphor layer is housed and sealed in an airtight area formed between the rigid substrate and the transparent moisture-resistant protective layer, the stimulable phosphor panel further comprising: a buffer space defined by a recess formed in the substrate, a ventilation hole connecting the recess with the airtight area and being formed in the substrate, and a flexible sheet covering an opening of the recess. Or, the stimulable phosphor panel further comprising: an airtight area which is formed between the rigid substrate and the transparent moisture-resistant protective layer and in which the stimulable phosphor layer is housed and sealed, and buffer space defined by a recess formed in the substrate, a ventilation hole connecting the recess with the airtight area and being formed in the substrate, and a flexible sheet covering an opening of the recess.

In the first aspect of the present invention, the flexible sheet preferably has a water vapor permeability of 0.1 $g/m^2$ day or less.

In the first aspect of the present invention, the flexible sheet preferably has one or more aluminum foil layers.

In the first aspect of the present invention, the flexible flexible sheet to the substrate along a periphery of the recess so that a hermetically-sealing border of the flexible sheet has a width of 3 to 50 mm.

In the first aspect of the present invention, the recess is preferably formed on a side of the substrate opposite to a side where the stimulable phosphor layer is formed.

In the first aspect of the present invention, the buffer space preferably has a volume that is variable within a range from 1/10 to twice of a sum of a spatial volume of the airtight area and a volume of the buffer space at 1 atm.

In a second aspect of the present invention, there is a stimulable phosphor panel comprising: a rigid substrate; a stimulable phosphor layer formed on the rigid substrate; and a transparent moisture-resistant protective layer formed on the stimulable phosphor layer, wherein the stimulable phosphor layer is housed and sealed in an airtight area between the rigid substrate and the transparent moisture-resistant protective layer, the stimulable phosphor panel further comprising: a buffer space communicating with the airtight area capable of expansion/contraction, the buffer space having a volume variable within a range from 1/10 to twice of a sum of a spatial volume of the airtight area and a volume of the buffer space at 1 atm.

In the second aspect of the present invention, at least a part of the buffer space is preferably formed with a flexible sheet, the flexible sheet preferably has a water vapor permeability of 0.1 g/m²·day or less, and the flexible sheet preferably has one or more aluminum foil layers.

In the second aspect of the present invention, the buffer space is preferably formed by bonding the flexible sheet to the substrate so that a hermetically-sealing border of the flexible sheet has a width of 3 to 50 mm.

In the first and second aspects of the present invention, the stimulable phosphor panel further comprises: a frame fixed to the rigid substrate so as to surround the stimulable phosphor layer on a front side of the rigid substrate, wherein the transparent moisture-resistant protective layer is bonded to a front surface of the frame by a bonding layer, and the airtight area is formed among the rigid substrate, the frame and the transparent moisture-resistant protective layer.

In the first and second aspects of the present invention, the frame has a height from a front surface of the rigid substrate as same as or close to that of the stimulable phosphor layer, and surround tightly the stimulable phosphor layer, the transparent moisture-resistant protective layer is laminated on front surfaces of the frame and the stimulable phosphor layer via the bonding layer, and the airtight area is formed between the rigid substrate and the transparent moisture-resistant protective layer, and within said frame.

The stimulable phosphor panel of the present invention includes a stimulable phosphor layer which is formed on a substrate and is sealed with a transparent moisture-resistant protective layer, and has a buffer space formed from a recess which is formed in the substrate, a ventilation hole which connects the recess with the airtight area where the stimulable phosphor layer is located, and a flexible sheet which covers the opening of the recess.

Therefore, when gas in the airtight area expands owing to a drop in atmospheric pressure and a rise in temperature outside the stimulable phosphor panel, for example, the gas in the airtight area moves into the buffer space and the flexible sheet allows the buffer space to have a larger volume, so that the buffer space can absorb any volume change in the airtight area caused by a rise in temperature or the like.

In other words, the action of the buffer space is capable of suppressing the enlargement in the gap between the stimulable phosphor layer and the transparent moisture-resistant protective layer due to expansion of gas in the airtight area and warping of the stimulable phosphor layer (lifting of the stimulable phosphor layer from the substrate) irrespective of the change in temperature or atmospheric pressure. Therefore, moisture absorption in the stimulable phosphor layer as well as lowering of the quality of image signals read from the stimulable phosphor layer are avoided.

Moreover, the stimulable phosphor panel of the present invention in which the recess formed in the substrate serves as a buffer space can secure a large enough buffer space without the necessity of upsizing the stimulable phosphor panel. It is particularly preferable that the recess be formed on the rear side of the substrate because a large enough buffer space is obtained with a simple structure without the necessity of upsizing the panel.

DETAILED DESCRIPTION OF THE PREFERRED EMBODIMENTS

The stimulable phosphor panel of the present invention will be described below in detail with reference to a preferable embodiment shown in the accompanying drawings.

Figure 1:
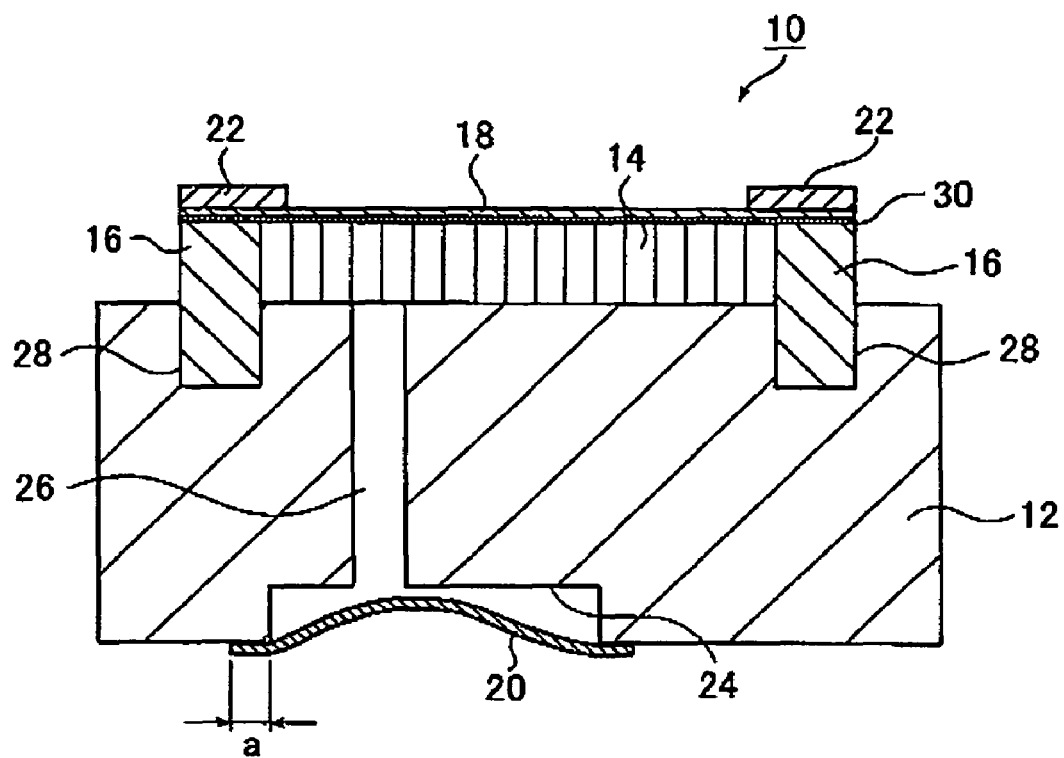
FIG. 1 is a sectional view showing the schematic structure of a stimulable phosphor panel of the present invention.

FIG. 1 is a sectional view showing the schematic structure of a stimulable phosphor panel of the present invention.

As shown in FIG. 1, a stimulable phosphor panel (hereinafter referred to as a "phosphor panel") 10 of the present invention has a rectangular substrate 12, a stimulable phosphor layer (hereinafter referred to as a "phosphor layer") 14 which is formed on the substrate 12 by vacuum evaporation, a frame 16 which is fixed to the substrate 12 so as to surround the phosphor layer 14 on the front side of the substrate 12, a transparent moisture-resistant protective layer (hereinafter referred to as a "moisture-resistant protective layer") 18 with which the phosphor layer 14 is covered and sealed to prevent the phosphor layer 14 from absorbing moisture, and a reinforcing frame 22 which reinforces the phosphor panel 10 from the front side of the moisture-resistant protective layer 18.

The substrate 12 has a recess 24 formed on its rear side, a ventilation hole 26 which connects the recess 24 with the phosphor layer 14, and a flexible sheet 20 which is stuck along the periphery of the recess 24 to cover the opening of the recess 24 and seal the inside of the recess 24. A space defined by the recess 24 which is covered with the flexible sheet 20, and by the ventilation hole 26 serves as a buffer space in the present invention.

There is no particular limitation on the material of the substrate 12 of the phosphor panel 10 according to the present invention as long as it has rigidity, and various materials used in common stimulable phosphor panels can be employed for the substrate 12.

Examples of employable substrate materials include: plastic films such as a cellulose acetate film, a polyester film, a polyethylene terephthalate film, a polyamide film, a polyimide film, a triacetate film, and a polycarbonate film; glass plates made of silica glass, non-alkali glass, soda glass, and heat-resistant glass (e.g., Pyrex™); metal sheets such as an aluminum sheet, an iron sheet, a copper sheet, and a chromium sheet; and metal sheets having metal oxide coatings.

The thickness of the substrate 12 is not particularly limited but is appropriately determined to provide a satisfactory buffer space as will be described later, and a lasting, satisfactory strength to the stimulable phosphor panel 10. However, the substrate 12 should not be unnecessarily thick. A thickness of about 3 mm to 20 mm, for example, is preferable for the substrate 12.

The substrate 12 has, as mentioned above, the recess 24 formed on the rear side and the ventilation hole 26 connecting the recess 24 with the airtight area where the phosphor layer 14 is formed. Details of the recess 24 and the ventilation hole 26 will be given later while the buffer space is described.

In a preferred embodiment of the phosphor panel 10, the frame 16 is placed on the front side of the substrate 12 to surround the area on the substrate 12 where the phosphor layer 14 is formed (i.e., the image pickup area of the phosphor panel 10).

The moisture-resistant protective layer 18 for sealing the phosphor layer 14 is bonded to the frame 16, thereby making the top surface of the phosphor layer 14 substantially flush with the bonding face of the moisture-resistant protective layer 18 when the phosphor layer 14 is sealed with the moisture-resistant protective layer 18. Thus, the phosphor layer 14 can be sealed with ease and, at the same time, is protected during the sealing or the like.

The shape of the frame 16 is not particularly limited but is appropriately determined in accordance with the shape of the image pickup area of the phosphor panel 10. In the illustrated case, the frame 16 is shaped like a square pole to match the shape of the substrate 12, and is opened at the top and the bottom.

There is no particular limitation on the material of the frame 16, and the frame 16 can be made from, for example, the same material as the substrate 12.

Any method can be employed to fix the frame 16 to the substrate 12. Various known methods including one that uses an adhesive or molten metal are employable.

Which adhesive is to be used to fix the frame 16 to the substrate 12 is not particularly limited. A preferred example is an epoxy adhesive. Similarly, which molten metal is to be used is not particularly limited. A preferred example is aluminum solder.

The frame 16 is positioned, for example, by the use of an appropriate jig to be fixed to the front side of the substrate 12. Preferably, as shown in FIG. 1, the frame 16 is fixed onto the substrate 12 by forming a groove 28 on the front side of the substrate 12 and inserting the frame 16 in the groove 28.

The groove 28 can be formed with very high positional accuracy by machining or the like. Therefore, the frame 16 is positioned by forming the groove 28 in the substrate 12 and inserting the frame 16 in the groove 28, whereby the positional accuracy of the frame 16 with respect to the substrate 12 and the positional accuracy with respect to the substrate 12 in forming the phosphor layer 14 through vacuum evaporation are improved and the image pickup area of the phosphor panel 10 can be properly placed within a predetermined range. Another advantage is that the frame 16 inserted in the groove 28 can have a thickness much thicker than that when the frame 16 is fixed to the surface of the substrate 12, thereby enhancing the mechanical strength of the phosphor panel 10, offering ease of handling during manufacture, and ensuring a higher degree of dimensional accuracy of the frame 16.

It is particularly preferable to employ a structure in which the frame 16 is fit into the groove 28 in order to enhance the positional accuracy of the frame 16 with respect to the substrate 12, the workability of the frame 16 when attached, and the like.

In the phosphor panel 10 of the present invention, the phosphor layer 14 is placed inside the frame 16 on the substrate 12.

There is no particular limitation on the stimulable phosphor used to form the phosphor layer 14, and various types of stimulable phosphors can be employed.

A preferred example is an alkali halide-based phosphor disclosed in JP 57-148285 A and expressed by a general formula "$M^I X \cdot a M^{II} {X'}_2 \cdot b M^{III} {X''}_3 : cA$". In the formula, $M^I$ is at least one selected from the group consisting of Li, Na, K, Rb, and Cs, $M^{II}$ is at least one divalent metal selected from the group consisting of Be, Mg, Ca, Sr, Ba, Zn, Cd, Cu, and Ni, $M^{III}$ is at least one trivalent metal selected from the group consisting of Sc, Y, La, Ce, Pr, Nd, Pm, Sm, Eu, Gd, Tb, Dy, Ho, Er, Tm, Yb, Lu, Al, Ga, and In, X, X', and X" are each at least one selected from the group consisting of F, Cl, Br and I, A is at least one selected from the group consisting of Eu, Tb, Ce, Tm, Dy, Pr, Ho, Nd, Yb, Er, Gd, Lu, Sm, Y, Tl, Na, Ag, Cu, Bi, and Mg, and a, b, and c satisfy $0 \leq a < 0.5$, $0 \leq b < 0.5$, and $0 \leq c < 0.2$, respectively.

An alkali halide-based phosphor in which $M^I$ contains at least Cs, X contains at least Br, and A is Eu or Bi is preferable because it has excellent photostimulated luminescence and is capable of achieving the effects of the present invention satisfactorily. A stimulable phosphor that is expressed by a general formula "CsBr:Eu" is particularly preferable.

The phosphor layer 14 of the phosphor panel 10 according to the present invention can be formed by any method, and various vacuum deposition methods including vacuum evaporation, sputtering, chemical vapor deposition (CVD), and coating can be employed.

Preferably, the phosphor layer 14 is formed by vacuum evaporation from the viewpoint of productivity and the like. It is particularly preferable that the phosphor layer 14 be formed by multi-source vacuum evaporation in which a phosphor component material and an activator component material are separately evaporated by heating. For instance, when the phosphor layer 14 is made of "CsBr:Eu" mentioned above, cesium bromide (CsBr) as a phosphor component material and europium bromide ($EuBr_x$ (x is usually 2 to 3)) as an activator component material are separately evaporated by heating in multi-source vacuum evaporation.

Instead of vacuum evaporation, the phosphor layer 14 may be formed by coating which involves dispersing a stimulable phosphor in a binder to prepare a coating; applying the coating to the substrate; and drying the coat.

When formed by vacuum deposition, the phosphor layer 14 receives heat treatment (annealing) in order to impart favorable photostimulated luminescence characteristics and to improve the photostimulated luminescence characteristics thereof.

There are no particular conditions put to the heat treatment of the phosphor layer 14. In a preferred example, the heat treatment is performed in an inert atmosphere such as a nitrogen atmosphere at 50° C. to 600° C., preferably 100° C. to 300° C., for 10 minutes to 10 hours, preferably 30 minutes to 3 hours.

A known method such as one that uses a firing furnace can be employed for the heat treatment of the phosphor layer 14. It is also possible to utilize for the heat treatment of the phosphor layer 14 a vacuum evaporation apparatus that has a means for heating the substrate 12.

The phosphor panel 10 of the present invention can have various films above and below the phosphor layer 14 without any particular limitation. For instance, a reflective film for reflecting photostimulated luminescence may be formed on the front side of the substrate 12, and films including a barrier film for protecting the reflective film may be formed on the reflective film.

In order to avoid moisture absorption in the phosphor layer 14, which is highly absorbent of moisture and whose characteristics are easily degraded by absorbed moisture, the phosphor panel 10 of the present invention has the moisture-resistant protective layer 18, and seals the phosphor layer 14 in an airtight area between the substrate 12 (and the frame 16 in the embodiment shown in FIG. 1) and the moisture-resistant protective layer 18.

Various materials can be employed for the moisture-resistant protective layer 18 as long as they have high moisture resistance. An example of the moisture-resistant protective layer 18 has three layers, namely, a $SiO_2$ film, a $SiO_2$-polyvinyl alcohol (PVA) hybrid layer, and another $SiO_2$ film, formed on a polyethylene terephthalate (PET) film. Other preferred examples include: a glass plate (or film); a resin film such as a polyethylene terephthalate film or a polycarbonate film; and a film obtained by depositing an inorganic material such as $SiO_2$, $Al_2O_3$, or SiC on a resin film. For formation of the moisture-proof protective film 18 having 3 layers of $SiO_2$ film/hybrid layer of $SiO_2$ and PVA/$SiO_2$ film on the PET film, the $SiO_2$ films may be formed through sputtering and the hybrid layer may be formed through a sol-gel process, for example. The hybrid layer is preferably formed to have a ratio of PVA to $SiO_2$ of 1:1.

How the phosphor layer 14 is sealed with the moisture-resistant protective layer 18 is not particularly limited. To give an example, the moisture-resistant protective layer 18 is bonded to the top face of the frame 16 by a bonding layer 30. In the present invention, the moisture-resistant protective layer 18 is bonded to the top face of the frame 16 alone, but it is preferable to bond the moisture-resistant protective layer 18 to the top face of the phosphor layer 14 and the top face of the frame 16 as shown in FIG. 1 so that the phosphor panel 10 obtained is more excellent in durability.

There is no particular limitation put on the bonding layer 30 as long as it is formed from a highly moisture-resistant adhesive. A preferred-example is polyester-based adhesive. In the case where the top face of the phosphor layer 14 is also bonded to the moisture-resistant protective layer 18, the bonding layer 30 is preferably formed from a material whose optical characteristics do not prevent incidence of radiation rays and emission of photostimulated luminescence.

The phosphor panel 10 of the present invention has the reinforcing frame 22 to prevent the moisture-resistant protective layer 18 bonded to the frame 16 from peeling off.

The shape of the reinforcing frame 22 is not particularly limited but is appropriately determined in accordance with the shape of the image pickup area of the phosphor panel 10. In the illustrated case, the reinforcing frame 22 is shaped like a square pole that is opened at the top and the bottom.

There is no particular limitation on the material of the reinforcing frame 22. Preferably, the reinforcing frame 22 is made from the same material as the frame 16 and/or the substrate 12 in order to prevent deformation due to a difference in thermal expansion coefficient between the frame 22 and the frame 16 or the substrate 12 and the stress at the bonding interface.

Any method can be employed to fix the reinforcing frame 22 to the moisture-resistant protective layer 18. Various known methods including one that uses an adhesive are employable.

As has been described above, the phosphor panel 10 of the present invention has a structure in which the phosphor layer 14 is sealed in the airtight area between the moisture-resistant protective layer 18 and the substrate 12 (and the frame 16 in the illustrated case) in order to prevent the phosphor layer 14 from absorbing moisture.

When the thus structured phosphor panel 10 is used in a high-altitude place where the atmospheric pressure is low or in a high-humidity environment, gas in the airtight area between the moisture-resistant protective layer 18 and the substrate 12 expands, thereby causing such problems as lifting the phosphor layer 14 from the substrate 12 (warping the phosphor layer 14) and widening the gap between the. phosphor layer 14 and the transparent moisture-resistant protective layer 18. As a result, image signals read from the phosphor layer 14 are lowered in quality.

The inventor of the present invention has proposed a phosphor panel that has a buffer space as disclosed in US 2003/0160188 A to solve the inconveniences described above. However, the proposed phosphor panel cannot secure a large enough space for the buffer space since the buffer space is outside the phosphor panel. Thus, other inconveniences including upsizing of the phosphor panel occur, as described above.

In contrast, in the phosphor panel 10 of the present invention, the recess 24 formed in the substrate 12, the ventilation hole 26 which connects the recess 24 with the airtight area, and the flexible sheet 20 which covers and closes the opening of the recess 24 constitute the buffer space, which absorbs gas that expanded in the airtight area between the moisture-resistant protective layer 18 and the substrate 12 due to changes in atmospheric pressure and temperature. In the illustrated case, the recess 24 is preferably formed on the rear side of the substrate 12 (on the side opposite to the side where the phosphor layer 14 is formed).

Figure 2:
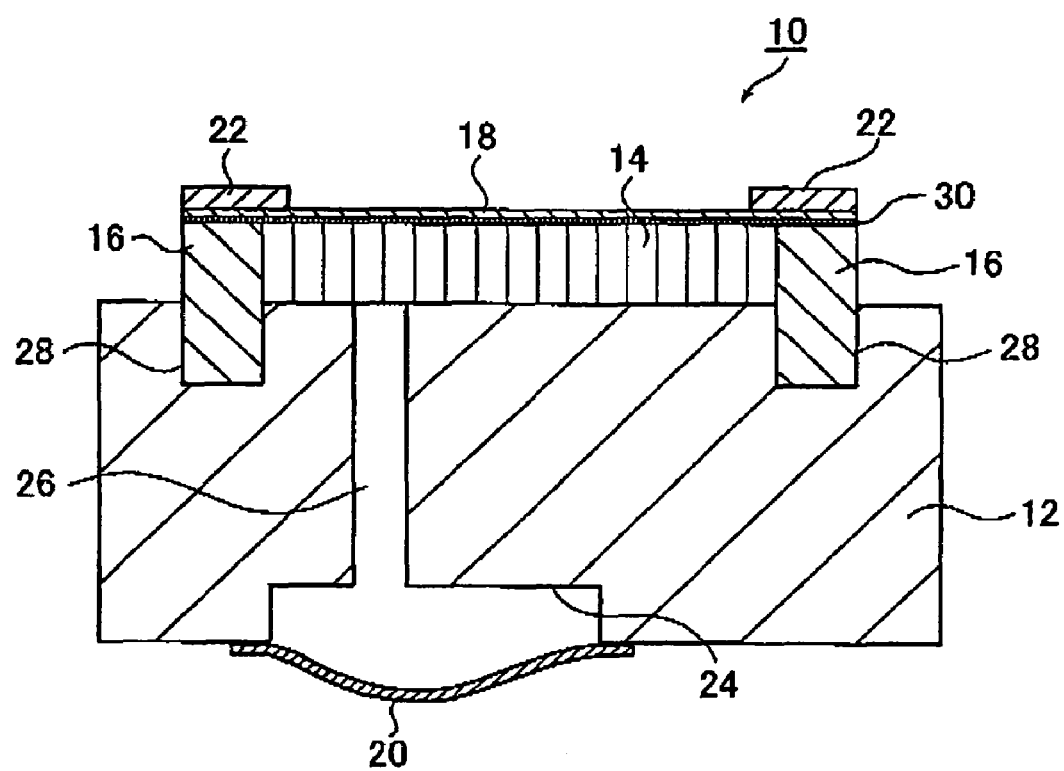
FIG. 2 is a diagram conceptually showing a sheet of the stimulable phosphor panel of the present invention in a state of being expanded.
Figure 3:
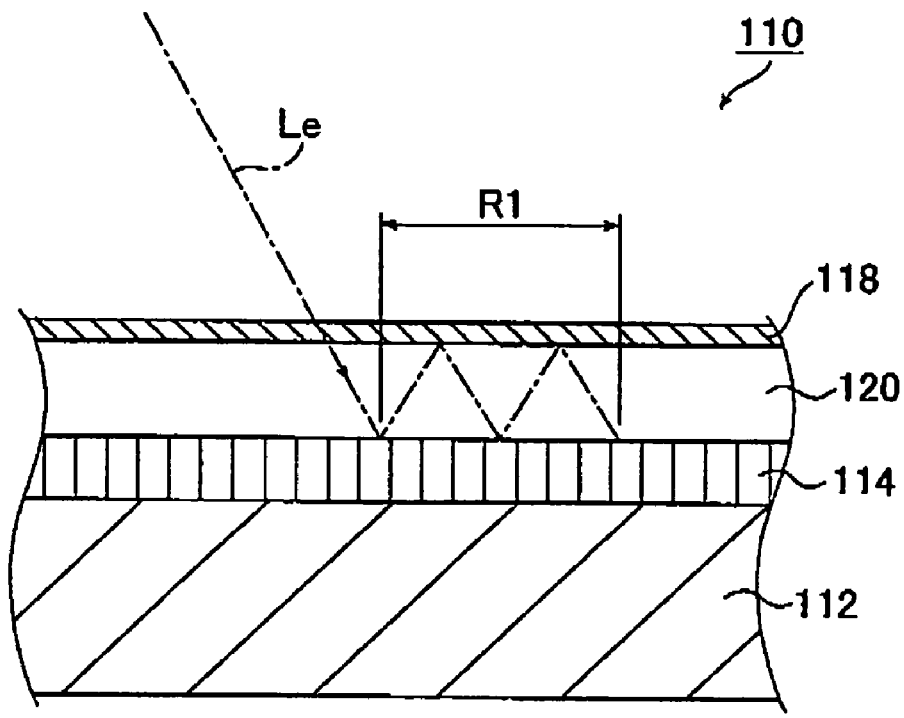
FIG. 3 is a side view conceptually showing an area over which excitation light spreads by multiple reflection in a wide gap between a stimulable phosphor layer and a transparent moisture-resistant protective layer.
Figure 4:
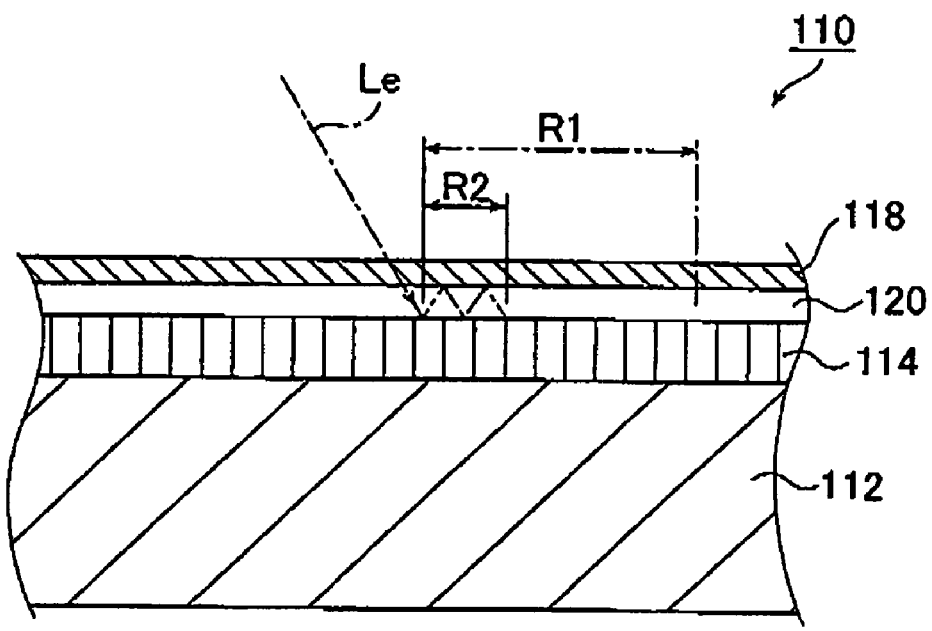
FIG. 4 is a side view conceptually showing an area over which excitation light spreads by multiple reflection in a narrow gap between a stimulable phosphor layer and a transparent moisture-resistant protective layer, the interface being shown in a thicker state to make it easier to understand.
Figure 5:
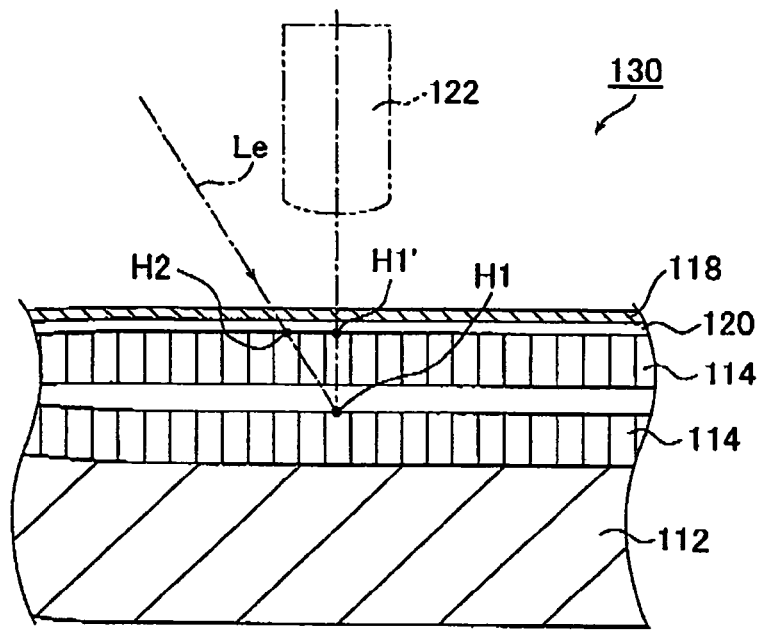
FIG. 5 is a side sectional view showing how a radiographic image is read from a warped stimulable phosphor layer.

When the gas in the airtight area expands more greatly in a high-altitude place where the atmospheric pressure is low or in a high-humidity environment than the case where the phosphor panel 10 is used in a normal-temperature, normal-pressure environment, the gas that expanded in the airtight area moves into and is absorbed in the buffer space, and the flexible sheet 20 is protruded outward as shown in FIG. 2. The phosphor panel 10 can thus avoid such problems as widening of the gap between the moisture-resistant protective layer 18 and the phosphor layer 14 and warping (lifting) of the phosphor layer 14.

Furthermore, the recess 24 communicating with the airtight area is formed in the substrate 12 and is closed to obtain the buffer space, so that the phosphor panel 10 of the present invention can have a large enough buffer space without increase in the panel size. In particular, if the recess 24 is formed on the rear side of the substrate 12 as in the illustrated case, a large enough buffer space is easily secured with simple machining.

The shape of the recess 24 is not particularly limited, but is appropriately determined in accordance with the shape of the substrate 12 and in what part of the substrate 12 the recess 24 is to be formed. In the illustrated case, the recess 24 is shaped like a square pole. The volume of the recess 24 is also not particularly limited but the volume of the recess 24 which ensures an enough volume for the buffer space and preferably allows the buffer space to vary in volume within a range described later, is appropriately determined in accordance with the shape and size of the substrate 12.

Any method can be employed to form the recess 24. Various known methods including machining and semiconductor manufacturing techniques are employable.

The ventilation hole 26 can take any form as long as it connects the recess 24 with the airtight area where the phosphor layer 14 is formed and allows the gas to flow thereinto quickly when expansion or the like takes place.

In the illustrated case, the ventilation hole 26 extends through the area where the phosphor layer 14 is formed, but the present invention is not limited thereto. Alternatively, the ventilation hole 26 may be extended to the airtight area where the phosphor layer 14 is not formed and which is sealed with the substrate 12 and the moisture-resistant protective layer 18.

The phosphor layer 14 usually has a porosity of 5% to 30%. Therefore, even if the ventilation hole 26 is formed in the area where the phosphor layer 14 is formed, sufficiently high gas permeability is achieved. On the other hand, formation of the ventilation hole 26 in other areas than the area where the phosphor layer 14 is formed is more advantageous in terms of gas permeability but causes a decrease in the surface area ratio of the image pickup area to the substrate 12. Accordingly, where to form the ventilation hole 26 is appropriately selected in accordance with the size and use of the phosphor panel and the environment where the phosphor panel is used.

Any method can be employed to form the ventilation hole 26. Various known methods including machining and semiconductor manufacturing techniques are employable.

The sheet 20 is not limited in any particular way, and various sheets can be employed as long as they have enough moisture resistance to prevent the phosphor layer 14 from absorbing moisture from the buffer space and also have enough flexibility to deform along with the flow of air having expanded in the airtight area into the buffer, thus making the volume of the buffer space variable. Various sheets cited for the moisture-resistant protective layer 18 are also employable. In order to lower the water vapor permeability to a very low level, the sheet 20 preferably has at least one aluminum foil layer. It is particularly preferable that the sheet 20 have aluminum foil layers.

The thickness of the sheet 20 is not particularly limited, and a thickness that can provide the moisture resistance and flexibility is appropriately chosen in accordance with the sheet material employed.

Preferably, the sheet 20 has a water vapor permeability of 0.1 g/m$^2$ day or less, and a material and a thickness that gives this water vapor permeability value are selected. Thus, the phosphor layer 14 is prevented from absorbing moisture and is allowed to keep the initial phosphor layer characteristics.

The shape and surface area of the sheet 20 are not particularly limited as long as the sheet 20 can cover the opening of the recess 24 to seal the recess 24 and the sheet 20 can fully function as the buffer space to accommodate the gas flux caused by changes in atmospheric pressure and temperature.

How the sheet 20 is bonded to the substrate 12 is not particularly limited. For instance, an adhesive having a given thickness is applied along the perimeter of the flexible sheet 20, and the adhesive-applied side of the flexible sheet 20 is faced to the substrate 12 and stuck to the substrate 12 so as to cover the periphery of the recess 24. Preferably, the flexible sheet 20 is warped in advance to sag toward the interior of the recess 24.

In order for the flexible sheet 20 to maintain satisfactory sealing performance, to be easily processed, and not to make the peripheral area of the buffer space larger than necessary, a hermetically-sealing border (indicated by a in FIG. 1) where the flexible sheet 20 is bonded to the substrate 12 along the periphery of the recess 24 is preferably 3 mm to 50 mm in width, more desirably 5 mm to 20 mm in width.

The volume of the buffer space structured as above is not particularly limited. To ensure that expansion/contraction of gas in the airtight area is thoroughly absorbed by the buffer space, it is preferable that the buffer space have a volume that is variable within a range from 1/10 to twice of the sum of the spatial volume of the airtight area between the substrate 12 and the moisture-resistant protective layer 18 where the phosphor layer 14 is formed and the volume of the buffer space at 1 atm.

For instance, when the phosphor layer 14 of the phosphor panel 10 shown in FIG. 1 measures 430 mm (L)×430 mm (W)×0.7 mm (H) and has a volume of 129. 43 cm$^3$, and the ratio of pores (porosity) in the phosphor layer 14 is about 20%, the spatial volume of the airtight area is about 25.9 cm$^3$.

The volume of the buffer space at 1 atm. is the sum of the volume of the recess 24 closed with the flexible sheet 20 at 1 atm. and the volume of the ventilation hole 26 at 1 atm.

For instance, when the airtight area has the spatial volume of 25.9 cm, and the volume of the buffer space is 7.3 cm$^3$, the sum of the two volumes is 33.2 cm$^3$. Therefore, the volume of the buffer space is variable within a range of 3.32 cm$^3$ to 66.4 cm$^3$.

In the phosphor panel 10 of the present invention, there is no particular limitation put on steps subsequent to bonding of the flexible sheet 20 to the rear side of the substrate 12 along the periphery of the recess 24.

The embodiment of FIG. 1 preferably includes the frame 16, but the frame 16 is not indispensable in the first aspect of the present invention.

Figure 6:
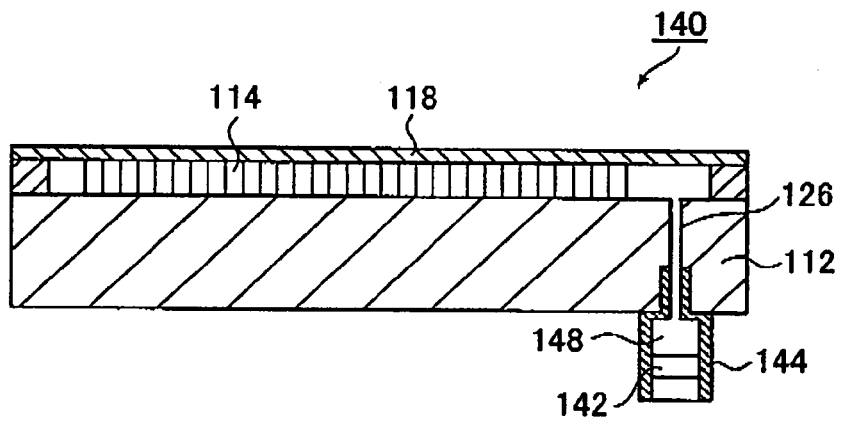
FIG. 6 is a sectional view showing the schematic structure of a conventional stimulable phosphor panel with a buffer space.
Figure 7:
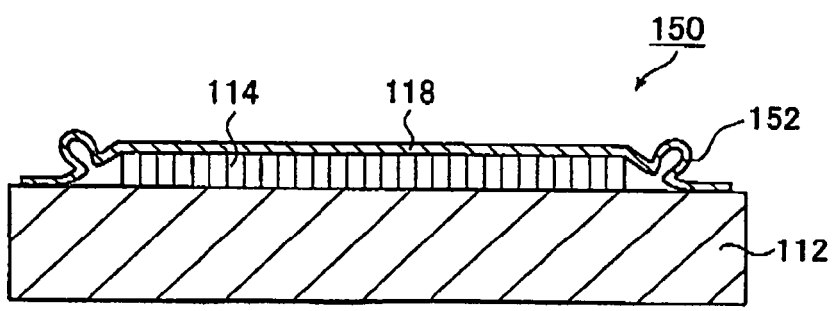
FIG. 7 is a sectional view showing the schematic structure of another conventional stimulable phosphor panel with a buffer space which is different from the one in FIG. 6.

In the case where the frame 16 is not used, as shown in FIG. 7 as referred to above and in FIGS. 1, 2, 6, 7, and 8 of US 2003/0160188 A, the perimeter of the moisture-resistant protective layer 18 for sealing the phosphor layer 14 is bonded directly to the substrate 12, and also to the top face of the phosphor layer 14.

The second aspect of the present invention is directed to a stimulable phosphor panel in which a rigid substrate, a stimulable phosphor layer, and a transparent moisture-resistant protective layer are deposited in this order with the stimulable phosphor layer housed and sealed in an airtight area between the substrate and the transparent moisture-resistant protective layer, and which has a buffer space capable of expansion/contraction as desired and communicating with the airtight area, the buffer space having a volume variable within a range from 1/10 to twice of the sum of the spatial volume of the airtight area and the volume of the buffer space at 1 atm.

In the second aspect of the present invention, the buffer space is not limited in any particular way, and can have any one of various structures including the ones shown in FIGS. 6 and 7. The embodiments disclosed in US 2003/0160188 A are also employable.

Described above is how a stimulable phosphor panel is manufactured according to the present invention. However, the present invention is not limited to the above embodiments, and various modifications and changes can be made without departing from the spirit of the present invention.

EXAMPLES

Specific examples of the present invention will be given below to describe the present invention in more detail with reference to the accompanying drawings. Needless to say, the present invention is not limited to the following examples.

A 450 mm×450 mm aluminum alloy plate (MIC-6, a product of Namekawa Alumi, Inc.) with a thickness of 10 mm was prepared as the substrate 12. The 110 mm×110 mm recess 24 was formed to a depth of 2 mm at a position on the rear side of the substrate 12, 10 mm apart from two neighboring sides of the substrate 12. The ventilation hole 26 piercing the substrate 12 was formed at a position 16 mm apart from each of the same two neighboring sides.

Formed next was the groove 28 as shown in FIG. 1, which was concentric with the substrate 12, had a 430 mm×430 mm square contour, and was 5 mm in width and 1.3 mm in depth.

After the groove 28 had been formed, the frame 16 which was made from the same aluminum material as the substrate 12, which had a 429.9 mm×429.9 mm square contour, and which was 4.8 mm in width, was fixed to the groove 28 by the use of a heat-resistant epoxy adhesive (Aremco-Bond 526 N, a product of Aremco Products, Inc.).

After the frame 16 had been bonded to the groove 28, a piece of kapton tape that had a heat-resistant adhesive (Scotch Kapton Tape 5413, a product of 3M) was stuck as a mask material to the top face of the frame 16 and an excess portion of the tape inside the frame 16 was cut off to prepare a mask.

Europium bromide as an activator material and cesium bromide as a phosphor material were separately evaporated in two-source vacuum evaporation to form, on the front side of the substrate 12, the phosphor layer 14 made of CsBr:Eu.

The substrate 12 was set in a substrate holder of a vacuum evaporation apparatus (vacuum chamber), film materials were set in predetermined positions, respectively, and then the vacuum chamber was closed to start evacuation by means of a diffusion pump or a cryogenic coil.

When the degree of vacuum reached $8 \times 10^{-4}$ Pa, argon gas was introduced into the vacuum chamber to adjust the degree of vacuum to 0.5 Pa. Then, a DC power source was driven to energize crucibles filled with deposition materials to thereby form through resistance heating the phosphor layer 14 on the front side of the substrate 12.

The output of the DC power source to both the crucibles was adjusted so that the molarity ratio of Eu/Cs in the phosphor layer 14 would be 0.003:1 and that the deposition rate would be 8 μm/mm.

While the phosphor layer 14 was being formed, the front side of the substrate 12 was directly heated by a halogen lamp.

At the time the thickness of the phosphor layer 14 reached about 710 μm, the deposition was ended and the substrate 12 was taken out of the vacuum chamber. The thickness of the phosphor layer 14 was controlled based on previously conducted experiments.

After the deposition had been finished, the piece of Kapton tape stuck to the frame 16 was removed, allowing the phosphor layer 14 to be formed only inside the frame 16.

The substrate 12 in this state was subjected to heat treatment in a nitrogen atmosphere at a temperature of 200° C. for 2 hours.

Meanwhile, a $SiO_2$ film was formed to a thickness of 100 nm by sputtering on a PET film 6 μm in thickness. On the $SiO_2$ film, a PVA-$SiO_2$ hybrid layer was formed to a thickness of 600 nm by a sol-gel process so that the ratio-of PVA to $SiO_2$ would be 1:1. Another $SiO_2$ film was formed on the hybrid layer by sputtering to a thickness of 100 nm, thereby obtaining the moisture-resistant protective layer 18. Next, polyester resin (Vylon 300, a product of TOYOBO Co., Ltd.) was applied to the entire surface of the moisture-resistant protective layer 18 (surface of the $SiO^2$ layer) to form the bonding layer 30 having a thickness of 1.2 μm.

Then, the substrate 12 on which the phosphor layer 14 had been formed was pre-heated to 100° C., and the moisture-resistant protective layer 18 cut into a size of 420 mm×420 mm was laid over the phosphor layer 14 so that the bonding layer 30 faced the phosphor layer 14. The moisture-resistant protective layer 18 was bonded to the top faces of the frame 16 and the phosphor layer 14 by thermal lamination to seal the phosphor layer 14.

A 130 mm×130 mm aluminum foil laminate film (PORIR, a product of Kyodo Packing Materials, Inc.) was prepared as the flexible sheet 20. An acrylic adhesive sheet (8161, a product of Sumitomo 3M Ltd.) with a thickness of 25 μm was stuck to the flexible sheet 20 along the perimeter at a position 10 mm inside the edges.

The flexible sheet 20 with the acrylic adhesive sheet attached thereto was warped in advance to sag toward the interior of the recess 24, and then bonded to the substrate 12 so as to cover the recess 24 formed on the rear side of the substrate 12. Lastly, the reinforcing frame 22 which was made of aluminum, which had a 430 mm×430 mm square contour, and which was 6 mm in width and 0.7 mm in thickness, was bonded to the top face of the moisture-resistant protective layer 18 by the use of an adhesive sheet (8161, a product of Sumitomo 3M Ltd.). The phosphor panel 10 shown in FIG. 1 was thus obtained.

In this phosphor panel 10, the volume of the buffer space at 1 atm. was 7.26 $cm^3$, the spatial volume of the airtight area was 24.7 $cm^3$, and the sum of the two volumes was 31.96 $cm^3$. The volume of the buffer space could be expanded up to 41.14 $cm^3$.

The phosphor panel 10 obtained as above was evaluated for the image sharpness in an environment where the temperature was 25° C. and the pressure was 1 atm. and in an environment where the temperature was 60° C. and the pressure was 0.7 atm. (corresponding to 2,500 m above sea level).

The sharpness was evaluated by: placing an MFT measurement chart on the surface of the obtained (radiographic image) conversion panel; irradiating the entire surface of the panel with 80-kvq (corresponding to 10 mR) X-rays; reading the chart with a radiographic image information reading apparatus (VELOCITY, a product of FUJI PHOTO FILM CO., LTD.); and calculating the MTF (1 cycle/mm).

As a result, when the MTF in the environment where the temperature was 25° C. and the pressure was 1 atm. was set as 100, the MTF in the environment where the temperature was 60° C. and the pressure was 0.7 atm. was 101. That is, equivalent sharpness was obtained. In the environment where the temperature was 60° C. and the pressure was 0.7 atm., the transparent moisture-resistant protective layer 18 was checked visually for expansion (i.e., lifting of the phosphor layer 14), and no expansion was observed.

A phosphor panel exactly the same as the phosphor panel 10 except for the absence of a buffer space was prepared (hereinafter referred to as comparison phosphor panel for the sake of convenience).

The comparison phosphor panel was evaluated for MTF in exactly the same environments. As a result, when the MTF of the phosphor panel of the present invention in the environment where the temperature was 25° C. and the pressure was 1 atm. was set as 100, the MTF of the comparison phosphor panel was 100 in the environment where the temperature was 25° C. and the pressure was 1 atm. but 85 in the environment where the temperature was 60° C. and the pressure was 0.7 atm., which showed a great drop in sharpness. The transparent moisture-resistant protective layer of the comparison phosphor panel was also visually checked for expansion in the environment where the temperature was 60° C. and the pressure was 0.7 atm. As a result, expansion of the transparent moisture-resistant protective layer and lifting of the phosphor layer were observed.

The above evaluation results have made it clear that, according to the present invention, the stimulable phosphor panel having the moisture-resistant protective layer 18 to avoid moisture absorption in the phosphor layer 14 can stop a low-pressure, high-temperature environment from causing gas in the airtight area to expand and lower the quality of image signals read from the stimulable phosphor layer.

What is claimed is:

1. A stimulable phosphor panel comprising:
   a rigid substrate;
   a stimulable phosphor layer formed on said rigid substrate; and
   a transparent moisture-resistant protective layer formed on said stimulable phosphor layer,
   wherein said stimulable phosphor layer is housed and sealed in an airtight area formed between said rigid substrate and said transparent moisture-resistant protective layer,
   said stimulable phosphor panel further comprising:
   a buffer space defined by a recess formed in said substrate, a ventilation hole connecting said recess with said airtight area and being formed in said substrate, and a flexible sheet covering an opening of said recess.

2. The stimulable phosphor panel according to claim 1, wherein said flexible sheet has a water vapor permeability of 0.1 g/m$^2$·day or less.

3. The stimulable phosphor panel according to claim 1, wherein said flexible sheet has one or more aluminum foil layers.

4. The stimulable phosphor panel according to claim 1, wherein said flexible sheet covers said opening of said recess by bonding said flexible sheet to said substrate along a periphery of said recess so that a hermetically-sealing border of said flexible sheet has a width of 3 to 50 mm.

5. The stimulable phosphor panel according to claim 1, wherein said recess is formed on a side of said substrate opposite to a side where said stimulable phosphor layer is formed.

6. The stimulable phosphor panel according to claim 1, wherein said buffer space has a volume that is variable within a range from 1/10 to twice of a sum of a spatial volume of said airtight area and a volume of said buffer space at 1 atm.

7. The stimulable phosphor panel according to claim 1, further comprising:
   a frame fixed to said rigid substrate so as to surround said stimulable phosphor layer on a front side of said rigid substrate,
   wherein said transparent moisture-resistant protective layer is bonded to a front surface of said frame by a bonding layer, and
   said airtight area is formed among said rigid substrate, said frame and said transparent moisture-resistant protective layer.

8. The stimulable phosphor panel according to claim 7,
   wherein said frame has a height from a front surface of said rigid substrate as same as or close to that of said stimulable phosphor layer, and surround tightly said stimulable phosphor layer,
   said transparent moisture-resistant protective layer is laminated on front surfaces of said frame and said stimulable phosphor layer via said bonding layer, and
   said airtight area is formed between said rigid substrate and said transparent moisture-resistant protective layer, and within said frame.

9. A stimulable phosphor panel comprising:
   a rigid substrate;
   a stimulable phosphor layer formed on said rigid substrate; and
   a transparent moisture-resistant protective layer formed on said stimulable phosphor layer,
   wherein said stimulable phosphor layer is housed and sealed in an airtight area formed between said rigid substrate and said transparent moisture-resistant protective layer,
   said stimulable phosphor panel further comprising:
   a buffer space communicating with said airtight area capable of expansion/contraction, said buffer space having a volume variable within a range from 1/10 to twice of a sum of a spatial volume of said airtight area and a volume of said buffer space at 1 atm,
   wherein at least a part of said buffer space is formed with a flexible sheet, and
   wherein said buffer space is formed by bonding said flexible sheet to said substrate so that a hermetically-sealing border of said flexible sheet has a width of 3 to 50 mm.

10. The stimulable phosphor panel according to claim 9, wherein said flexible sheet has a water vapor permeability of 0.1 g/m$^2$·day or less.

11. The stimulable phosphor panel according to claim 9, wherein said flexible sheet has one or more aluminum foil layers.

12. The stimulable phosphor panel according to claim 9, further comprising:
    a frame fixed to said rigid substrate so as to surround said stimulable phosphor layer on a front side of said rigid substrate,
    wherein said transparent moisture-resistant protective layer is bonded to a front surface of said frame by a bonding layer, and
    said airtight area is formed among said rigid substrate, said frame and said transparent moisture-resistant protective layer.

13. The stimulable phosphor panel according to claim 12,
    wherein said frame has a height from a front surface of said rigid substrate as same as or close to that of said stimulable phosphor layer, and surround tightly said stimulable phosphor layer,
    said transparent moisture-resistant protective layer is laminated on front surfaces of said frame and said stimulable phosphor layer via said bonding layer, and
    said airtight area is formed between said rigid substrate and said transparent moisture-resistant protective layer, and within said frame.

* * * * *